United States Patent

Mishima

Patent Number: 5,764,031
Date of Patent: Jun. 9, 1998

[54] METHOD AND APPARATUS FOR SUPPLYING A POWER SOURCE TO AN ELECTRONIC APPARATUS

[75] Inventor: Kazuo Mishima, Chiba, Japan

[73] Assignee: Sony Corporation, Japan

[21] Appl. No.: 912,586

[22] Filed: Aug. 18, 1997

Related U.S. Application Data

[63] Continuation of Ser. No. 798,050, Feb. 11, 1997, abandoned, which is a continuation of Ser. No. 292,200, Aug. 18, 1994, abandoned.

[30] Foreign Application Priority Data

Aug. 25, 1993 [JP] Japan ................... 5-232291

[51] Int. Cl.$^6$ .................................... H02J 7/00
[52] U.S. Cl. .................. 320/124; 320/127; 320/135; 320/136
[58] Field of Search .................. 320/124, 127, 320/135, 136

[56] References Cited

U.S. PATENT DOCUMENTS

| | | | |
|---|---|---|---|
| 4,056,764 | 11/1977 | Endo et al. | 320/15 |
| 4,130,731 | 12/1978 | Bolgiano et al. | 325/55 |
| 4,694,237 | 9/1987 | Hanson | 320/15 |
| 4,999,665 | 3/1991 | Kuroda et al. | 354/468 |
| 5,028,858 | 7/1991 | Schnizler et al. | 320/13 |
| 5,164,761 | 11/1992 | Isono et al. | 354/468 |
| 5,185,566 | 2/1993 | Goedken et al. | 320/48 |
| 5,200,685 | 4/1993 | Sakamoto | 320/2 |
| 5,200,688 | 4/1993 | Patino et al. | 320/13 |
| 5,256,956 | 10/1993 | Tsuchiya et al. | 320/15 |
| 5,270,946 | 12/1993 | Shibasaki et al. | 320/48 |
| 5,300,874 | 4/1994 | Shimamoto et al. | 320/15 |
| 5,359,318 | 10/1994 | Asai et al. | 320/13 |
| 5,381,179 | 1/1995 | Kashimura | 348/376 |
| 5,387,858 | 2/1995 | Bender et al. | 320/15 |
| 5,485,073 | 1/1996 | Kasashima et al. | 320/15 |

FOREIGN PATENT DOCUMENTS

| | | |
|---|---|---|
| 0238803 | 9/1987 | European Pat. Off. . |
| 0 335 316 | 10/1989 | European Pat. Off. . |
| 3908324 | 9/1990 | Germany . |
| 4014611 | 11/1991 | Germany . |

Primary Examiner—Peter S. Wong
Assistant Examiner—K. Shin
Attorney, Agent, or Firm—Ronald P. Kananen

[57] ABSTRACT

It is intended to realize a power supplying method of an electronic apparatus and its electronic apparatus which can be continuously used for a long time by using both an internal battery and an external battery. A power source is supplied to a video camera by an internal battery 25 and an external battery 13. A voltage of the internal battery 25 is detected by resistors 27 and 35 and a comparator 31. A voltage of the external battery 13 is detected by resistors 13a and 13b. In the case where the external battery 13 is driven and the internal battery 25 is equal to or larger than a predetermined voltage, the driving of the external battery 13 is stopped. At the same time, the internal battery 25 is driven.

15 Claims, 7 Drawing Sheets

| BATTERY REMAINING AMOUNT DISPLAY FONT | CAUTION DISPLAY | DISPLAY LEVEL |
|---|---|---|
|  | | 4/4 |
|  | | 3/4 |
|  | | 2/4 |
|  | | 1/4 |
|  |  | PRE END |
|  |  | END |

METHOD AND APPARATUS FOR SUPPLYING A POWER SOURCE TO AN ELECTRONIC APPARATUS

This application is a continuation of application Ser. No. 08/798,050 filed Feb. 11, 1997 now abandoned, which is a continuation of application Ser. No. 08/292,200 filed Aug. 18, 1994 now abandoned.

BACKGROUND OF THE INVENTION

1. Field of the Invention

The present invention relates to a power source supplying method of an electronic apparatus which is suitable when it is used in a technical field of a video camera or the like, and to a power source supplying device of an electronic apparatus to which the power source supplying method is applied.

2. Description of the Related Art

A video camera in which a built-in battery and an externally attached battery are driven as power sources has been known. In such a built-in battery in the video camera, there is no battery which is used for a long time in order to reduce a size of an apparatus.

OBJECTS AND SUMMARY OF THE INVENTION

Therefore, it is possible to photograph for a long time by using both the built-in battery and the externally attached battery. In this case, the externally attached battery is preferentially driven to the built-in battery. Due to this, even if an ample amount of capacity of the built-in battery remains, the externally attached battery is driven. On the other hand, in order to drive a video camera by the built-in battery after the externally attached battery was used, the externally attached battery must be detached.

Therefore, it is an object of the invention to provide a power source supplying method of an electronic apparatus such as a video camera or the like in which a built-in battery and an externally attached battery are efficiently driven and which can be used for a long time, and to provide a power source supplying device of an electronic apparatus to which the power supplying method is applied.

According to the invention, there is provided a power source supplying method of an electronic apparatus characterized in that the apparatus has a main body portion to which a power source voltage is supplied, a built-in battery, and an externally attached battery, a voltage of the built-in battery is detected by detecting means, and when the detected voltage is equal to or larger than a predetermined value and the externally attached battery is driven, the driving of the externally attached battery is stopped and a power source is supplied from the built-in battery to the main body portion.

According to the invention, there is provided a power source supplying method of an electronic apparatus characterized in that the apparatus has a main body portion to which a power source voltage is supplied, a built-in battery, and an externally attached battery, the main body portion has a display section for displaying a display indicating which one of the built-in battery and the externally attached battery is driven.

Moreover, according to the invention, there is also provided a power source supplying method of an electronic apparatus characterized in that the apparatus has a main body portion to which a power source voltage is supplied, a built-in battery, and an externally attached battery, and when the power supply to the main body portion is switched from either one of the built-in battery and the externally attached battery to the other, a period of time during which the power source is simultaneously supplied from any one of the batteries to the main body portion is set and, in such a period of time during which no power source is supplied, a power source is supplied to the main body portion from a capacitor which was charged before switching.

Further, according to the invention, there is provided a power source supplying method of an electronic apparatus characterized in that the apparatus has a main body portion to which a power source is supplied, a built-in battery, and an externally attached battery, a state in which the battery for supplying a power source voltage to the main body portion is switched from either one of the built-in battery and the externally attached battery to the other one is stored by memory means, and in the case where the switching state has been stored by the memory means even when the voltage of the other battery drops, the switching to the other battery is prohibited.

According to the invention, there is provided a power source supplying device of an electronic apparatus characterized in that the apparatus has a main body portion to which a power source voltage is supplied, a built-in battery, and an externally attached battery, a voltage of the built-in battery is detected by detecting means, and when the detected voltage is equal to or larger than a predetermined value and the externally attached battery is driven, the driving of the externally attached battery is stopped and a power source is supplied from the built-in battery to the main body portion.

According to the invention, there is provided a power source supplying device of an electronic apparatus characterized in that the apparatus has a main body portion to which a power source voltage is supplied, a built-in battery, and an externally attached battery, the main body portion has a display section for displaying a display indicating which one of the built-in battery and the externally attached battery is driven.

Moreover, according to the invention, there is also provided a power source supplying device of an electronic apparatus characterized in that the apparatus has a main body portion to which a power source voltage is supplied, a built-in battery, and an externally attached battery, and when the power supply to the main body portion is switched from either one of the built-in battery and the externally attached battery to the other, a period of time during which the power source is simultaneously supplied from any one of the batteries to the main body portion is set and, in such a period of time during which no power source is supplied, a power source is supplied to the main body portion from a capacitor which was charged before switching.

Further, according to the invention, there is provided a power source supplying device of an electronic apparatus characterized in that the apparatus has a main body portion to which a power source is supplied, a built-in battery, and an externally attached battery, a state in which the battery for supplying a power source voltage to the main body portion is switched from either one of the built-in battery and the externally attached battery to the other one is stored by memory means, and in the case where the switching state has been stored by the memory means even when the voltage of the other battery drops, the switching to the other battery is prohibited.

The above, and other, objects, features and advantages of the present invention will become readily apparent from the following detailed description thereof which is to be read in connection with the accompanying drawings.

DETAILED DESCRIPTION OF THE PREFERRED EMBODIMENTS

An embodiment in the case where a power source supplying method and device of an electronic apparatus according to the invention is applied to a video camera will be explained hereinbelow with reference to the drawings. FIGS. 1 to 5 are external views of a grip remote controller for a video camera. The grip remote controller is attached to, for example, the bottom portion of the video camera and supplies an external power source to the video camera.

Figure 1:
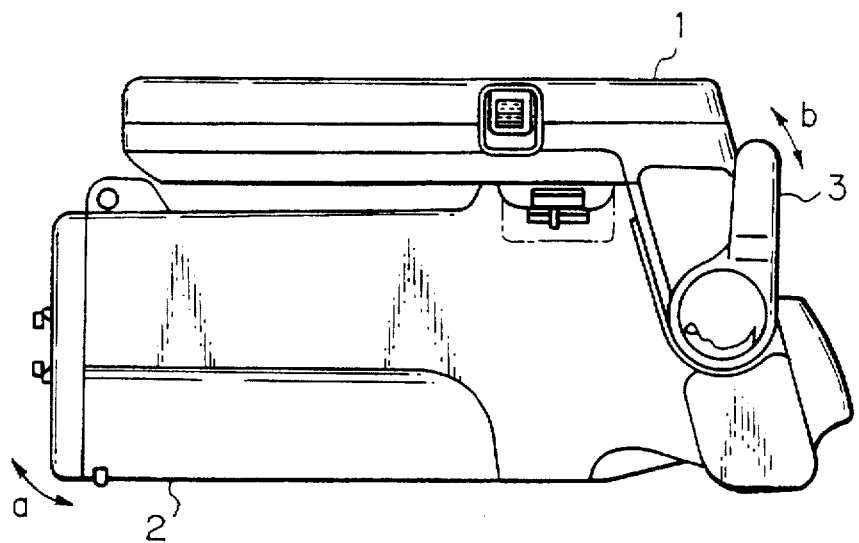
FIG. 1 is a side elevational view of a grip remote controller.

FIG. 1 is a side elevational view of a grip remote controller (hereinbelow, referred to as a grip remocon). The grip remote controller comprises: a video camera mounting portion 1; a grip portion 2; a fixing lever 3 of the grip portion, and the like. The grip portion 2 can be rotated in the direction of an arrow (a) and the fixing lever 3 of the grip portion can be rotated in the direction of an arrow (b). When the fixing lever 3 of the grip portion is rotated and loosened, the grip portion 2 is set to a rotatable state. When the grip portion 2 is rotated to a desired position, the fixing lever 3 of the grip portion is rotated to a fixed position and the grip portion 2 is fixed to such a position.

Figure 2:
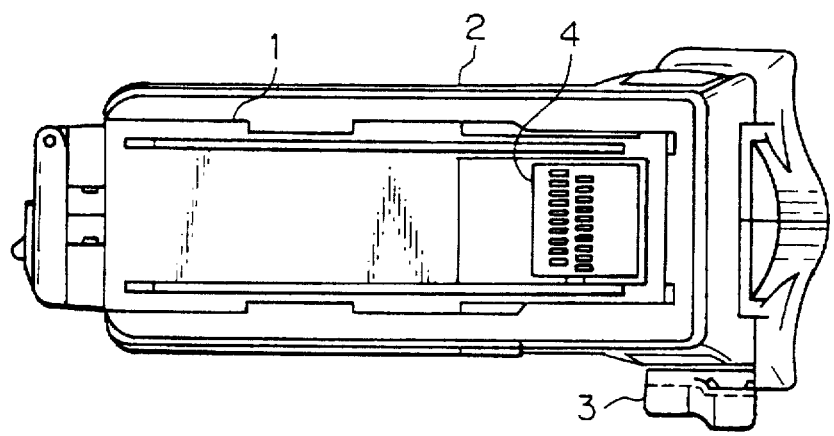
FIG. 2 is a top view of the grip remote controller.
Figure 3:
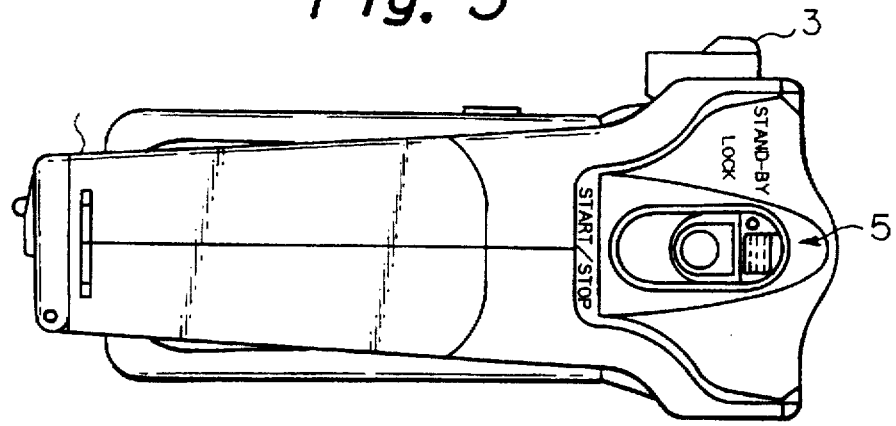
FIG. 3 is a bottom view of the grip remote controller.
Figure 4:
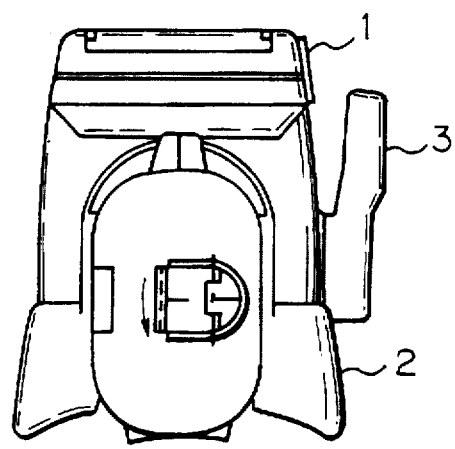
FIG. 4 is a front view of the grip remote controller.
Figure 5:
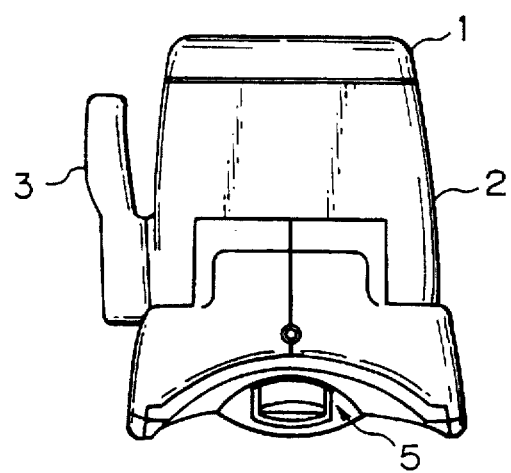
FIG. 5 is a rear view of the grip remote controller.

FIG. 2 shows a top view of the grip remote controller and FIG. 3 is a bottom view thereof. As will be understood from FIG. 2, a contact terminal 4 is provided for the video camera mounting portion 1. An external power source of the grip remote controller is supplied though the contact terminal 4 to a video camera main body. As will be also understood from FIG. 3, control switches 5 are provided for the grip portion 2. As control switches, for example, a stand-by switch for setting a video camera to a recordable state, a start/stop switch for starting or stopping the recording, and the like are provided. FIG. 4 shows a front view of the grip remote controller and FIG. 5 is a rear view thereof.

A block diagram in the case where a power source system of the grip remote controller and video camera mentioned above is connected is shown in FIG. 6. A construction of the block diagram of FIG. 6 will be described hereinbelow. Reference numeral 11 denotes a grip remote controller and 12 denotes an internal power source system of the video camera. An external battery 13 is provided for the grip remote controller 11. A (+) terminal of the external battery 13 is connected to one end of each of a regulator 14, a resistor 13a, and a switch 16. A (−) terminal of the secondary battery 13 is connected to the ground. Another end of the resistor 13a is connected to a grip controller 15 and is also connected to the ground through a resistor 13b. A voltage of the external battery 13 is detected by the resistors 13a and 13b. The opening/closing operation of the switch 16 is controlled by the grip controller 15. Another terminal of the switch 16 is connected to one end of a capacitor 17. On the other hand, another end of the capacitor 17 is connected to the ground. Another end of the switch 16 is connected to the grip controller 15 through a resistor 18 at a connecting point 19. The connecting point 19 is further connected to the ground through a resistor 20.

The opening/closing operations of a switch 21 whose one end is connected to the ground and a switch 23 whose one end is connected to the ground through a resistor 22 are controlled by control signals from the grip controller 15. Another end of each of the switches 21 and 23 are connected to the internal power source system 12.

A signal from the internal power source system 12 is supplied to an adder 24 together with a signal through the regulator 14. An output of the adder 24 is supplied to the grip controller 15. The signal supplied from the internal power source system 12 to the adder 24 is also supplied to the grip controller 15. A flag is further supplied from the internal power source system 12 to the grip controller 15. The driving operations of the built-in battery and the externally attached battery are switched by the supply of such a flag.

One end of the capacitor 17 is connected to a (+) terminal of an internal battery 25 provided for the internal power source system 12 and to one end of each of resistors 26 and 27, a regulator 28, and a capacitor 29. A (−) terminal of the internal battery 25 is connected to one end of a switch 30. Another end of the switch 30 is connected to the ground. Another end of the resistor 26 is connected to one end of each of a comparator 31 and a resistor 32. Another end of the resistor 32 is connected to one end of the switch 30 and is also connected to the ground through a resistor 33. An output of the comparator 31 is connected to a mode controller 34. Another end of the resistor 27 is connected to the mode controller 34 and is also connected to the ground through a resistor 35. Another end of the capacitor 29 is connected to the ground.

The opening/closing operations of the switch 30 are controlled by a signal supplied through the switches 21 and 23. Another end of the regulator 28 is connected to one end of each of the mode controller 34 and a resistor 36. Another end of the resistor 36 is connected to another end of each of the switches 21 and 23 and to the mode controller 34.

A predetermined terminal of the mode controller 34 is connected to the ground and another predetermined terminal is connected to a character generator 37. In the character generator 37, annexed data (for example, a display indicating which one of the internal battery or external battery is driven, a display of a remaining amount of the battery, or the like) corresponding to the supplied signal is generated and is supplied to an adder 38. A video image signal which is input from a terminal 39 is supplied to the adder 38. In the adder 38, the annexed data is superimposed to the video signal supplied through the terminal 39. An output signal of the adder 38 is supplied to a view finder 40.

Figure 6:
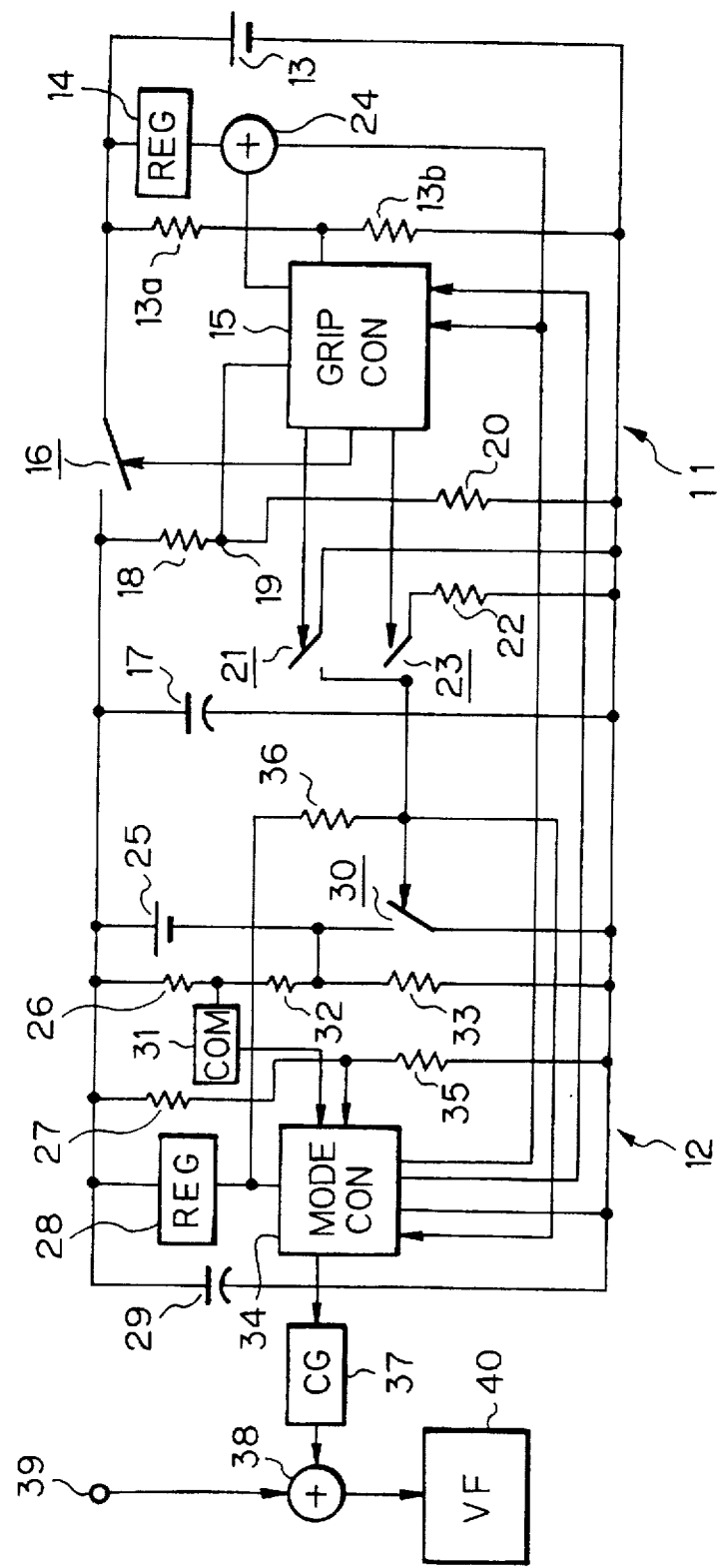
FIG. 6 is a block diagram in the case where power source systems of the grip remote controller and a video camera are connected.

The operation of a block diagram in FIG. 6 will be described hereinbelow. In the case where only the internal power source system 12 is solely used, the video camera is pulled up to an output voltage (for example, 5 V) of the regulator 28 by the resistor 36. Due to this, the switch 30 is turned on and the voltage of the internal battery 25 is supplied to the mode controller 34.

In the case where the video camera is used by a power source of only the grip remote controller 11, a control signal from the grip controller 15 is supplied to the switch 30 through the switches 21 and 23. Due to this, the switch 30 is turned off. After that, the switch 16 is turned on by the grip controller 15. Due to this, the external battery 13 of the grip remote controller 11 is driven.

In the case where the grip remote controller 11 is connected to the internal power source system 12 and there is a power source of only the grip remote controller 11, the on/off operations of the switches 16, 21, and 23 are controlled by the grip controller 15. That is, for instance, when the resistors 27 and 35 detect that a capacity of the internal battery 25 is less than a predetermined value, a flag is supplied from the mode controller 34 to the grip controller 15. The switch 23 is turned on by the flag. After the elapse of a predetermined time, the switch 21 is turned on. Due to this, the switch 30 is turned off. After that, the switch 16 is turned on by the grip controller 15. Therefore, a voltage is supplied from the external battery 13 to the mode controller 34.

In the case where the grip remote controller 11 is connected to the power source system 12 of the video camera and both of the power sources can be driven, the internal battery 25 is preferentially driven by the mode controller 34.

In the case where the grip remote controller 11 is connected to the power source system 12 of the video camera and both power sources have only the minimum capacities such that the video camera can be driven, a hunting (phenomenon such that one of the power sources is first driven, another power source is subsequently driven, and the first power source is driven again) occurs. Therefore, all of the capacities of both of the batteries are consumed. In order to prevent the hunting, according to the invention, the following processes are executed.

For example, while the internal battery 25 is driven, at the time point when the capacity is less than a predetermined value, the switch 30 is turned off. A flag is supplied from the mode controller 34 to the grip controller 15. The external battery 13 is driven by the flag. When the capacity of the external battery 13 is soon less than the predetermined value, an external battery end memory flag is set in the grip controller 15. At the same time, data regarding the capacity of the internal battery 25 (self-recovery, exchange of the internal battery, or the like) is supplied to the mode controller 34 through the comparator 31.

When the capacity of the internal battery 25 is equal to or larger than the predetermined value, the switch 30 is turned on and the internal battery 25 is driven. When the capacity of the internal battery 25 is again less than the predetermined value, the mode controller 34 refers to the external battery end memory flag of the grip controller 15. Due to this, the switching operation from the internal battery 25 to the external battery 13 is prohibited. As mentioned above, the hunting is prevented.

As an internal battery and an external battery, for example, lithium batteries, nickel-cadmium batteries, or the like are used.

Figures 7A, 7B, 7C, 7D, 7E, 7F, 7G:
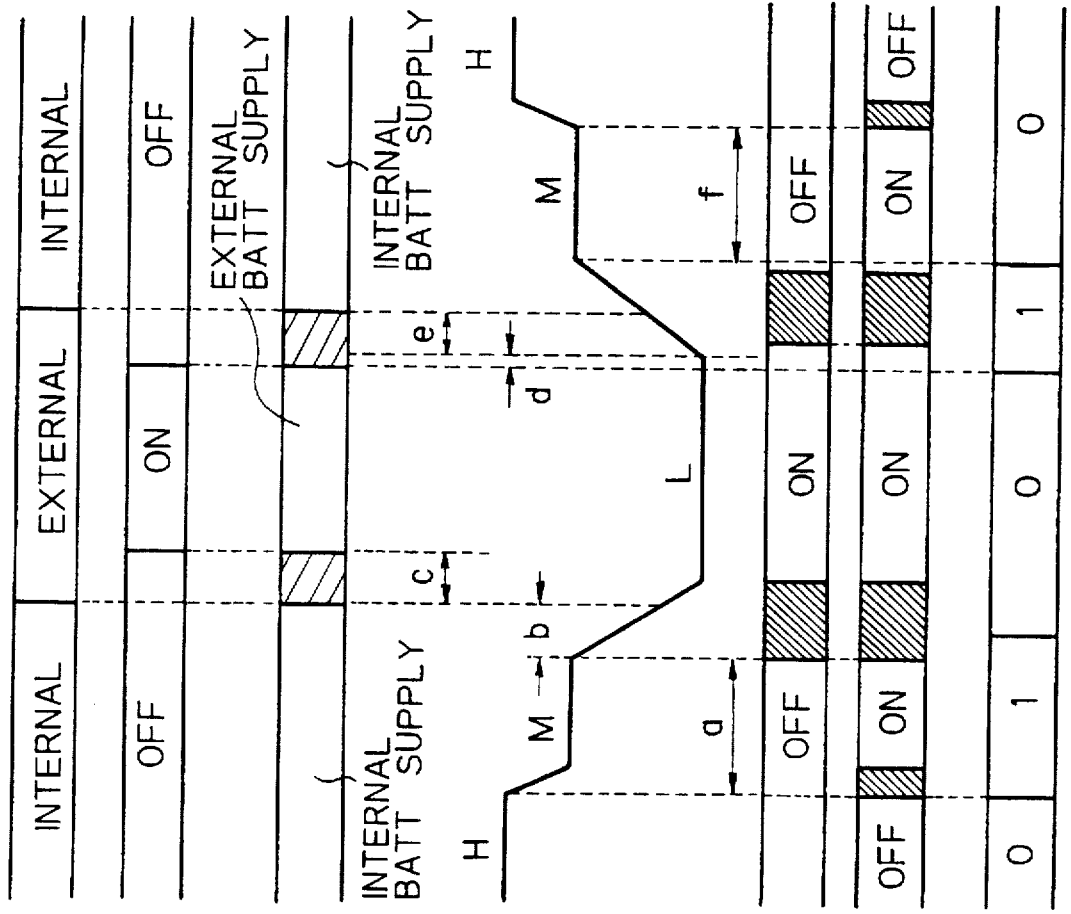
FIGS. 7A to 7G are timing charts regarding the switching of an internal battery and an external battery.

FIGS. 7A to 7G are timing charts with respect to the switching of the internal battery 25 and the external battery 13. FIG. 7A shows a timing for switching driving batteries (the internal battery and the external battery). FIG. 7B shows a timing for switching the on/off operations of the switch 16. FIG. 7C shows a timing for switching the battery to supply a voltage to the regulator in the video camera. FIG. 7D shows a timing for switching the control voltage which is applied to the switch 30. FIG. 7E shows a timing for switching the on/off operations of the switch 21. FIG. 7F shows a timing for switching the on/off operations of the switch 23. FIG. 7G shows a timing for switching the flag which is supplied from the internal power source system 12 to the grip remote controller 11.

Explanation will now be made with respect to a period of time (a) in FIG. 7, hereinbelow. The period (a) relates to the case where the video camera is driven by the internal battery 25. When the internal battery 25 is driven, the switch 16 is turned off and a voltage is supplied to the regulator 28 from the internal battery 25. When a state in which the voltage of the internal battery 25 is equal to or less than the predetermined value is detected by the resistors 27 and 35, the detected value is supplied to the mode controller 34. At that time, the flag is sent from the mode controller 34 to the grip controller 15. A control signal is generated from the grip controller 15 to the switch 23 by the flag and the switch 23 is turned on. Due to this, the control signal supplied to the switch 30 is changed from the H level (the internal battery driving) to the M level (at the time of transition of the driving battery from the internal battery to the external battery). At the same time, the flag 1 is supplied from the mode controller 34 to the grip controller 15.

For a period of time (b), a control signal to the switch 30 is changed from the M level to the L level (the external battery driving). In this instance, the switches 21 and 23 are turned on. A flag o to reset the flag 1 is supplied from the mode controller 34 to the grip controller 15.

For a period of time (c), both of the switches 16 and 30 are turned off and a driving voltage is supplied to the video camera by the charged capacitor 17 (refer to hatched portions in FIG. 7C).

When the period (c) is finished, the switch 16 is turned on and the driving voltage is supplied from the external battery 13 to the video camera. At that time, the switches 21 and 23 are turned on. Due to this, the switch 30 is set to an off state.

For a period of time (d), the flag 1 indicative of a change from the L level to the M level is supplied from the mode controller 34 to the grip controller 15. At the same time, the supply of the driving voltage to the video camera is started by the charged capacitor 17. The switch 16 is turned off.

For a period of time (e), the control signal is actually changed from the L level to the M level. At the end of the period (e), the switch 30 is turned on. Due to this, the video camera is driven by the internal battery.

For a period of time (f), the flag 0 for resetting the flag 1 is supplied from the mode controller 34 to the grip controller 15 and the control signal is set to the M level. In this instance, the switch 21 is turned off and the switch 23 is turned on. When the period (f) is finished and the control signal is set to the H level, the switch 23 is also turned off.

At the period of (c), (d) and (e), there is a case where a large electric current flows from the capacitor 17 (rush current). In order to prevent the decrease of supplied voltage by the rush current, a time t o supply the voltage by capacitor 17 is reduced as short as possible. While in an operation which needs a large electric current (for example in a case of mechanical transition time), a signal such as a flag or the like is not supplied from the mode controller 34 to the grip controller 15, thereby reducing a probability such that the producing of the rush current, and a period to supply the voltage by the capacitor overlap.

Figure 8A:
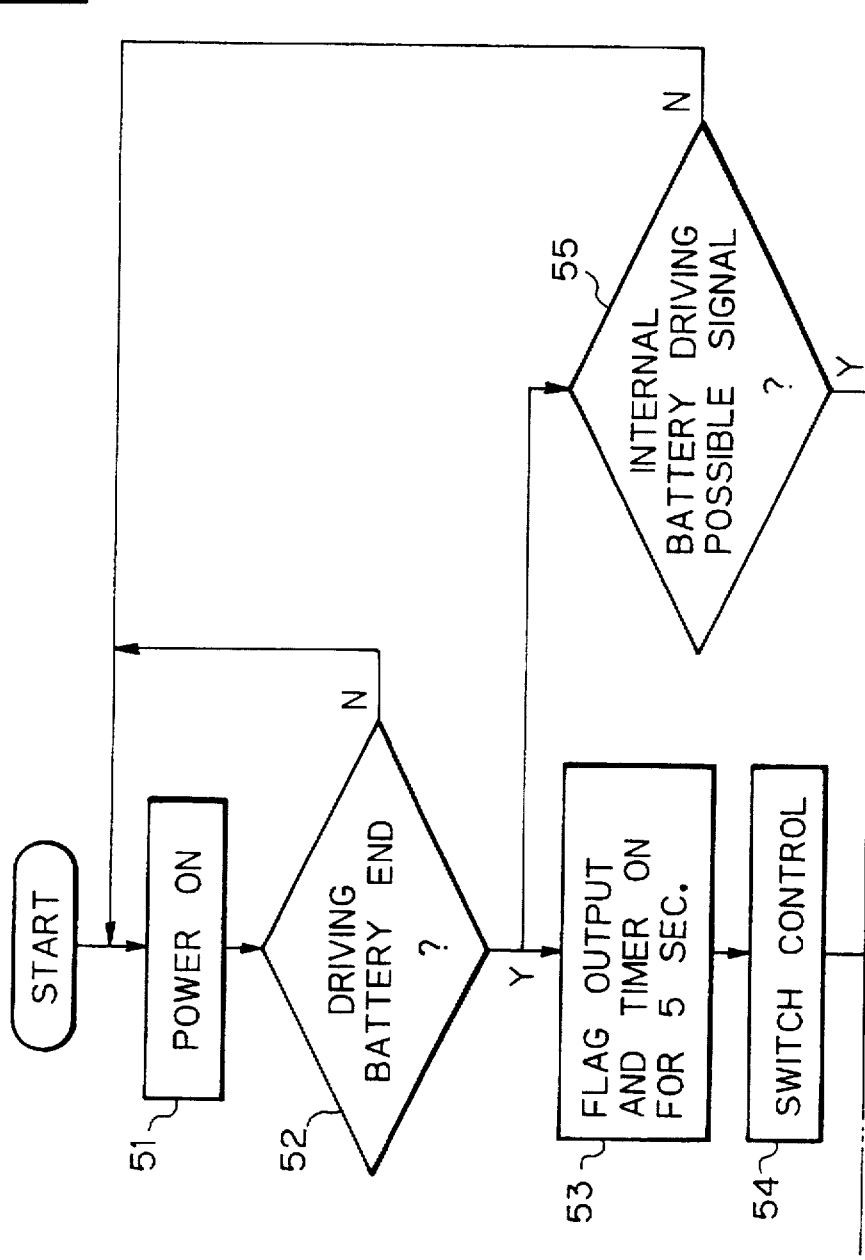
FIGS. 8A and 8B are flowcharts of the relay operation for selecting a power source which is supplied to the video camera.
Figure 8B:
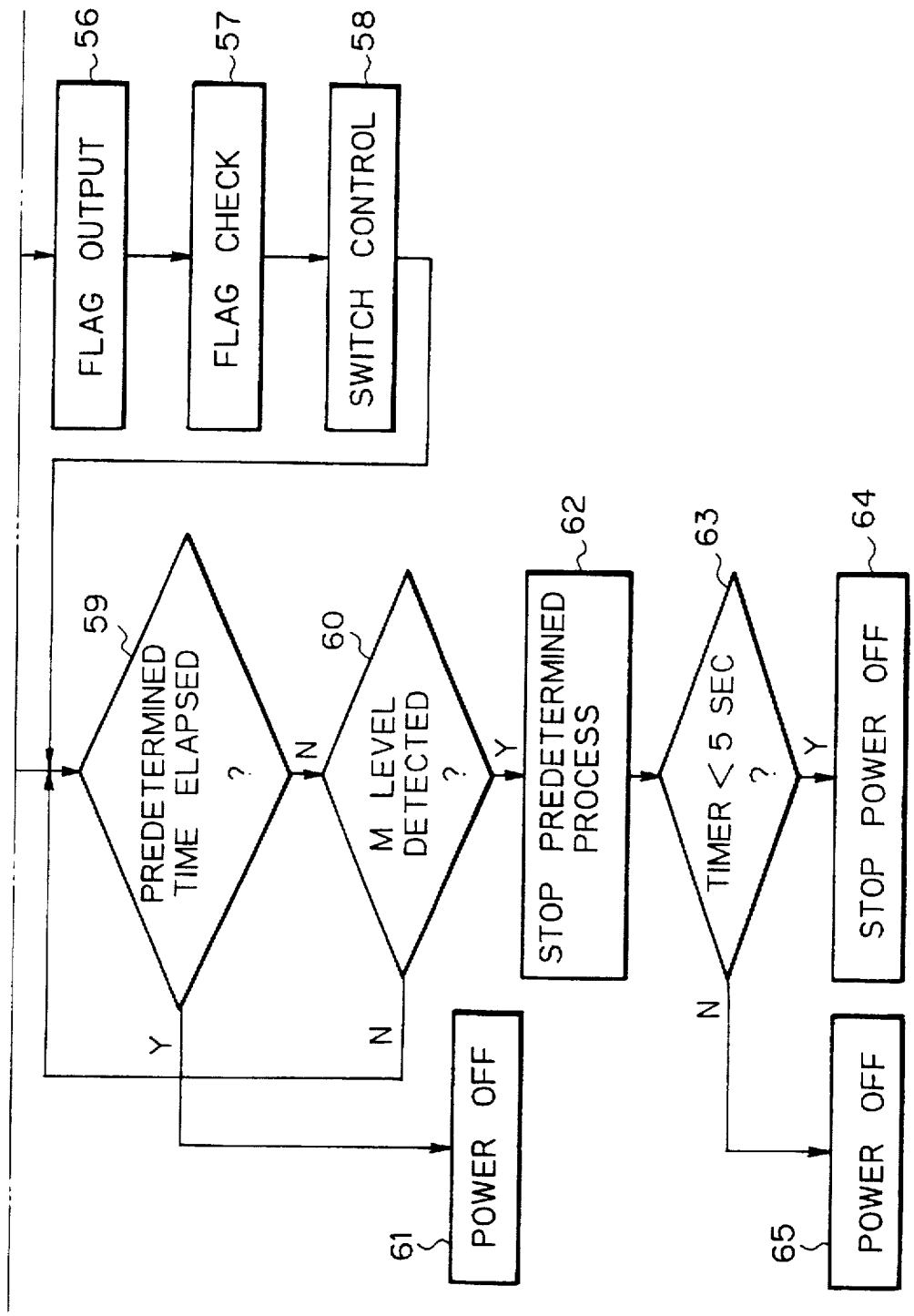

FIGS. 8A and 8B are flowcharts of the relay operation for selecting a power source which is supplied to the video camera. In FIGS. 8A and 8B, when the video camera is turned on (step 51), whether the capacity of the battery (the internal battery or the external battery) which is being driven is empty or not is detected in step 52. In the case where the battery capacity remains, a processing routine is returned to step 51. On the other hand, in the case where the capacity of the battery is empty, step 53 or step 55 follows.

A case where the driving battery detected in step 52 is the internal battery will be described hereinbelow. When it is detected that the capacity of the internal battery is empty in step 52, a flag is output from the mode controller 34 to the grip controller 15 and a timer which is provided in the mode controller 34 (for example, a five-second timer) is turned on (step 53). In step 54, the switch 30 is turned off by turning on the switches 21 and 23. After that, the switch 16 is turned on and the external battery 13 is driven.

On the other hand, a case where the driving battery whose capacity was detected in step 52 is an external battery will now be described. After it was detected that the capacity of the external battery was empty in step 52, whether an internal battery driving possible signal is supplied from the comparator 31 to the mode controller 34 or not is detected (step 55). When it is detected that the internal battery driving possible signal is supplied, a flag is output from the mode controller 34 to the grip controller 15 (step 56). The internal battery driving possible signal is generated in the case where the internal battery was recovered by itself or where it was exchanged to a new internal battery. When the flag generated from the mode controller 34 is confirmed by the grip controller 15 (step 57), the switches 16, 21, 23, and 30 are controlled (step 58). Namely, after the switches 16, 21, and 23 were turned off, the switch 30 is turned on. Due to this, the internal battery 25 is driven.

At the same time with step 54 or step 58, the processing of step 59 is done. In step 59, whether a predetermined period of time has elapsed or not is detected with reference to a counter value of the timer turned on in step 53. In the case where the predetermined period of time doesn't elapsed, the foregoing M level is detected (step 60). On the other hand, after the elapse of the predetermined period of time, (the timer equals or exceeds five seconds) the power source is turned off and a power off of the video is executed (step 61). In step 60, in the case where the M level is detected (a transition from the M level to the L level or a transition from the L level to the M level), the execution of a process similar to the process in the case where the capacity of the battery which is being driven is empty (driving of only the portions which are not concerned with photographing) is stopped (step 62).

After the process was stopped in step 62, whether the timer which was turned on by the mode controller 34 is less than five seconds or not is detected (step 63). In the case where the timer is less than five seconds, the power-off of the video camera is stopped (step 64). On the other hand, in the case where the timer equals or exceeds five seconds, the power-off of the video camera is executed (step 65).

Figure 9:
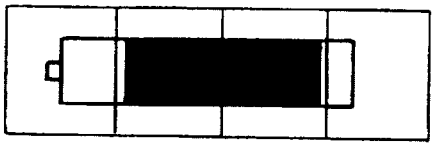
FIG. 9 is an example of annexed data which is displayed in a view finder.
Figure 9:
Figure 9:
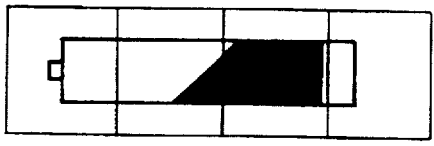
Figure 9:
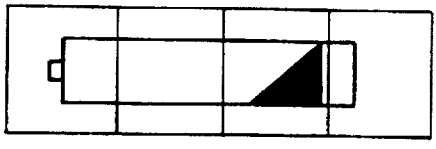
Figure 9:
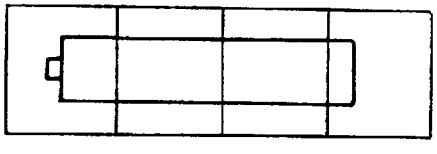
Figure 9:
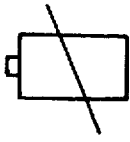
Figure 9:
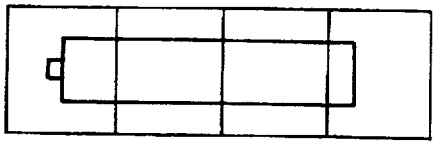
Figure 9:
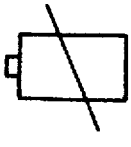

FIG. 9 shows an example of the annexed data which is displayed in the view finder 40 attached to the video camera. In the view finder 40, for example, data of a battery remaining amount display font and a caution (warning) display shown in FIG. 9 is displayed. The data display is classified into, for example, six levels.

In a state in which the battery has been fully charged, the display of a remaining amount is shown as a full-state (the display level is 4/4). When the battery is driven to a certain degree, a remaining amount corresponding to the consumed electric power is displayed (the display level is 3/4). Further, when the battery is consumed, a display corresponding to it is performed (the display level is 2/4). When the battery is still further consumed and the remaining amount is set to 1/4 as compared with the full-charge state, a display corresponding to it is performed. When the battery remaining amount is less than 1/4 as compared with the full-charge state, a display of the battery having no capacity is performed in the battery remaining amount display font and the caution display is performed by 0.8 Hz (the display level at this time is pre-end). When the battery is further consumed, the caution display is performed by 3.2 Hz (the display level at this time is end).

The remaining amount of the battery is sampled at a V period and a chattering is set for one second. In case of the same display unit, it is decided.

According to the invention, in the case where the internal battery and the external battery are used together, both of the batteries can be efficiently used by the switching of the switch. The apparatus can be eternally used by exchanging the internal battery and the external battery at a proper time.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A power source supplying method for supplying a power source voltage to an electronic apparatus having a main body portion to which the power source voltage is supplied by a built-in battery within said main body portion or an externally attached battery within an externally attached controller unit mounted on said main body portion, the method comprising:

detecting a voltage of said built-in battery;

comparing the detected voltage of said built-in battery and a first predetermined value while said power source voltage is supplied to said main body portion by said externally attached battery;

detecting a voltage of said externally attached battery;

comparing the detected voltage of said externally attached battery and a second predetermined value;

storing in a memory means an indication when said externally attached battery is determined to have a voltage below said second predetermined value;

controlling whether said built-in battery or said externally attached battery supplies said power source voltage to said main body portion, wherein said controlling includes interrupting said externally attached battery from providing said power source voltage and causing said built-in battery to supply said power source voltage when the voltage of the built-in battery is determined to be equal to or greater than said first predetermined value, and further wherein said controlling includes preventing said externally attached battery from attempting to supply said power source voltage to said main body portion when said memory means contains said indication that said externally attached battery was determined to have a voltage below said second predetermined voltage; and displaying whether said built-in battery or said externally attached battery is supplying a power source voltage to said main body portion.

2. A power source supplying method of an electronic apparatus according to claim 1, wherein said displaying is performed with a display section of said main body portion which is a view finder.

3. A power source supplying method of an electronic apparatus according to claim 1, wherein said displaying further comprises displaying an indication of an amount of power remaining in the battery which is supplying said power source voltage to said main body portion.

4. A power source supplying method as claimed in claim 1, further comprising:

charging a capacitor while said power source voltage is supplied to said main body portion by said built-in battery or said externally attached battery;

setting a period of time during which no power source voltage is supplied to said main body portion, said period of time being the time between when said power source voltage ceases being supplied by either said built-in battery or said externally attached battery and commences to be supplied by the other of said built-in battery or said externally attached battery; and supplying a power source voltage to said main body portion with said capacitor during said period of time.

5. A power source supplying method of an electronic apparatus according to claim 4, further comprising storing a mode in which said main body portion needs a large electric power in memory means and when said mode is selected, prohibiting a switching operation of said batteries.

6. A power source supplying method of an electronic apparatus, according to claim 1, wherein said externally attached battery is part of a grip remote controller which is connected to said electronic apparatus, which is a video camera.

7. A power source supplying device of an electronic apparatus having a main body portion to which a power source voltage is supplied, a built-in battery within said main body portion, and an externally attached battery within an externally attached controller unit mounted on said main body portion comprising:

first detecting means for detecting a voltage of said built-in battery;

first comparing means for comparing the detected voltage of said built-in battery and a first predetermined value while said power source voltage is supplied to said main body portion by said externally attached battery;

second detecting means for detecting a voltage of said externally attached battery;

second comparing means for comparing the detected voltage of said externally attached battery and a second predetermined value;

memory means for storing an indication when said externally attached battery is determined, by said second comparing means, to have a voltage below said second predetermined value;

control means for controlling whether said built-in battery or said externally attached battery supplies said power source voltage to said main body portion, wherein said control means interrupt said externally attached battery from providing said power source voltage and cause said built-in battery to supply said power source voltage when the voltage of the built-in battery is determined by said first comparing means to be equal to or greater than said first predetermined value, and further wherein said control means prevent said externally attached battery from attempting to supply said power source voltage to said main body portion when said memory means contains said indication that said externally attached battery was determined by said second comparing means to have a voltage below said second predetermined voltage; and a view finder which is located in said main body portion for indicating whether said built-in battery or said externally attached battery is supplying a Power source voltage to said main body portion.

8. A power source supplying device of an electronic apparatus according to claim 2, characterized in that said view finder further indicates an amount of power remaining in the battery which is supplying said power source voltage.

9. A power source supplying device as claimed in claim 2, further recorder apparatus having a main body portion to which a power source voltage is supplied, a built-in battery within said main body portion, and an externally attached battery within an comprising:

a capacitor which is charged while said power source voltage is supplied to said main body portion by said built-in battery or said externally attached battery; and control means for setting a period of time during which no power source voltage is supplied to said main body portion, said period of time being the time between when said power source voltage ceases being supplied by either said built-in battery or said externally attached battery and commences to be supplied by the other of said built-in battery or said externally attached battery;

wherein a power source voltage is supplied to said main body portion by said capacitor during said period of time.

10. A power source supplying device of an electronic apparatus according to claim 9, wherein a mode in which said main body portion needs a large electric power is stored by memory means and when said mode is selected by operating means, the switching operation of said batteries is prohibited.

11. A power source supplying device of an electronic apparatus, according to claim 7, wherein said externally attached battery is part of a grip remote controller which is connected to said electronic apparatus, which is a video camera.

12. A power source supplying method of a camera-integrated video recorder apparatus having a main body portion to which a power source is supplied, a built-in battery within said main body portion, and an externally attached battery within an externally attached controller unit comprising:

storing in memory means an indication when said power source voltage has been successively supplied to said main body portion first by said built-in battery or said externally attached battery and then the other of said built-in battery and said externally attached battery; and preventing said built-in battery or said externally attached battery from commencing to supply said power source voltage to said main body portion if said indication is stored in said memory means.

13. A power source supplying method of an electronic apparatus according to claim 12, further comprising erasing said indication, if stored in said memory means when said externally attached battery is replaced.

14. A power source supplying device of a camera-integrated video recorder apparatus having a main body portion to which a power source is supplied, a built-in battery within said main body portion, and an externally attached battery within an externally attached controller unit comprising:

memory means for storing an indication when said power source voltage has been successively supplied to said main body portion first by said built-in battery or said externally attached battery and then the other of said built-in battery and said externally attached battery; and control means for preventing said built-in battery or said externally attached battery from commencing to supply said power source voltage to said main body portion if said indication is stored in said memory means.

15. A power source supplying device of an electronic apparatus according to claim 14, wherein said indication, if stored in said memory means, is erased when said externally attached battery is replaced.

* * * * *